(No Model.) 8 Sheets—Sheet 1.
H. W. KIRCHNER & G. N. CHASE.
CAR FOR ELEVATED STRUCTURES.
No. 513,268. Patented Jan. 23, 1894.

(No Model.) 8 Sheets—Sheet 5.

H. W. KIRCHNER & G. N. CHASE.
CAR FOR ELEVATED STRUCTURES.

No. 513,268. Patented Jan. 23, 1894.

(No Model.) 8 Sheets—Sheet 7.

H. W. KIRCHNER & G. N. CHASE.
CAR FOR ELEVATED STRUCTURES.

No. 513,268. Patented Jan. 23, 1894.

Witnesses
F. R. Cornwall
A. Ramel

Inventors
H. William Kirchner
George N. Chase
By Paul Bakewell
Atty (No Model.) 8 Sheets—Sheet 8.

H. W. KIRCHNER & G. N. CHASE.
CAR FOR ELEVATED STRUCTURES.

No. 513,268. Patented Jan. 23, 1894.

UNITED STATES PATENT OFFICE.

HENRY WILLIAM KIRCHNER, OF DENVER, COLORADO, AND GEORGE N. CHASE, OF PASADENA, CALIFORNIA.

CAR FOR ELEVATED STRUCTURES.

SPECIFICATION forming part of Letters Patent No. 513,268, dated January 23, 1894.

Application filed December 5, 1892. Serial No. 454,127. (No model.)

*To all whom it may concern:*

Be it known that we, HENRY WILLIAM KIRCHNER, residing at Denver, in the county of Arapahoe and State of Colorado, and GEORGE N. CHASE, residing at Pasadena, in the county of Los Angeles and State of California, (said CHASE of the United States Army,) citizens of the United States, have invented certain new and useful Improvements in Cars for Elevated Structures, of which the following is a full, clear, and exact description, reference being had to the accompanying drawings, forming a part of this specification, wherein—

Fig. 7 is a detail view, illustrating the means for actuating the operating rods for the aeroplanes simultaneously.

Our invention has relation to a new and improved means of transportation, and has for its object the adaptation of the principle, that air, striking against an inclined surface, such as an aeroplane at an incline will be deflected, and such deflection, or the contact of the air against the surface, will exert a force opposing that of the air deflection line, which force or pressure we utilize as a lifting medium, not only to relieve the weight of the car from the wheels, and thereby overcome track friction, but, also, as a medium to overcome, to a certain extent, the repellent law of gravity exerted upon a body moving up an incline. This underlying principle of a law of nature, forms the primary object and essential feature of our invention, but there are other and minor details, whose functions, conjoined with that above set forth, are also important, and tend, in their way, to accomplish the best results in the application of this principle to a car or other means of transportation, as hereinafter described.

Figures 11, 12, 13:
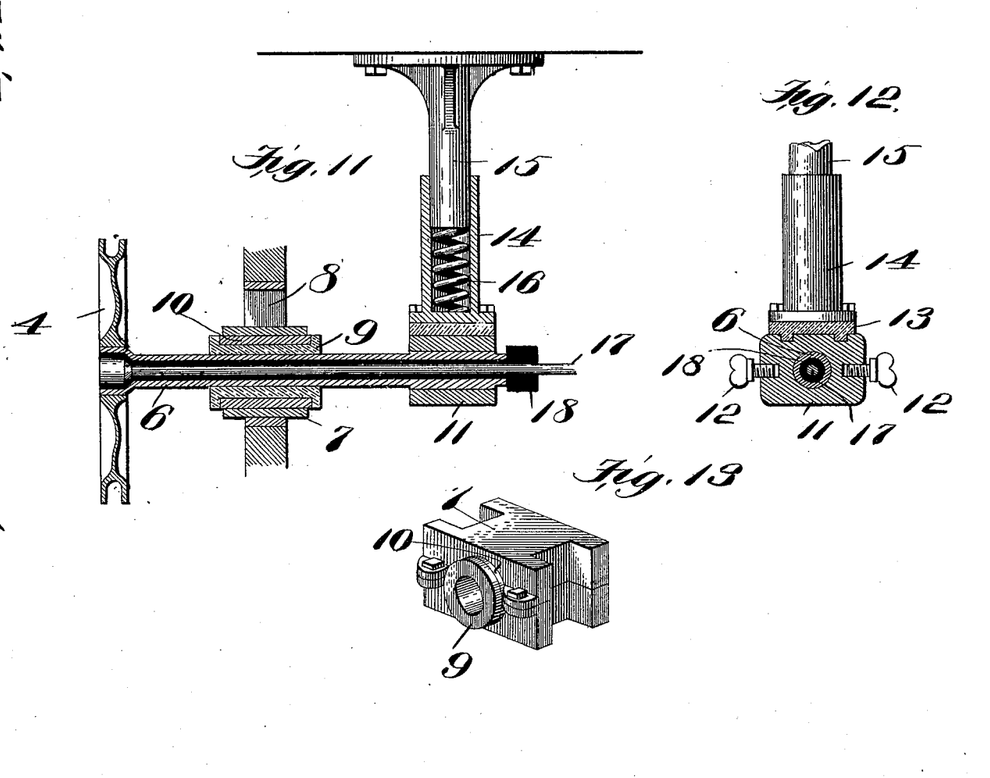
Fig. 11 is a sectional view of the vertically movable trolley, and the means for holding it in contact with the wire.
Fig. 12 is a cross-section through the "post" block, taken at right angles to the section shown in Fig. 11, to more clearly show the binding posts.
Fig. 13 is a perspective of the bearing, or journal-box, for the shaft of the vertically-movable trolley.

Referring to the accompanying drawings, wherein like symbols refer to like parts wherever they occur: 1 indicates a car, or other suitable means of transportation, which car is preferably pointed at its ends (one, only, being shown), having its top curved or crowned, and extending downwardly at its ends; which form we have adopted as the most convenient in this instance, to "cut" the air, when the car is moving at a high rate of speed. This car is provided with a series of supporting track-wheels 2 near its top, whose axles 3 are provided with a suitable propelling medium, which, in this instance, is illustrated as a motor 3 mounted directly upon the axles to obtain more power. The motors 3 are supplied with electricity, through a trolley running on a trolley-wire 5, supported by brackets on the elevated way. This trolley and its associate parts are illustrated in detail in Figs. 11, 12, and 13, wherein the trolley 4, being of copper or other suitable conduction material is mounted upon a hollow sleeve of similar conduction material 6, which sleeve is supported by, and runs in, a vertically-movable bearing or journal-box 7, mounted in a way 8 in the side of the car. To insulate the sleeve 6 from the box 7, we surround the same at its bearing point with the box, by a rubber or other non-conducting material 8, provided with flanges 9, between which flanges is clasped a metallic bearing ring 10, which runs in the box 7. The box is preferably of that class commonly known as "split boxes," as shown in Fig. 13. To yieldingly hold the trolley in electrical contact with the wire 5, and still maintain connection with the service wires running to the motors, we extend the sleeve 6 inwardly a short distance, where it is mounted in a "post" block 11, to which the binding-posts 12 (see Fig. 12) are attached. Connected to this "post" block 11, and insulated therefrom by a rubber section 13, is a sleeve 14 which extends upwardly and surrounds a stud 15 suspended by a bracket from the top of the car. Between the bottom of this stud and bottom of the socket in the sleeve 14, is interposed a compression-spring 16, whose function is to always tend to force the trolley 4 downwardly on the wire 5.

As the construction above referred to only extends a short distance from one side of the car, and as the opposite side is provided with a similar trolley, we connect the two, for obvious reasons, by a shaft 17, which is insulated from the sleeve 6 by a rubber sleeve 18 extending throughout the length of the same.

Figure 1:
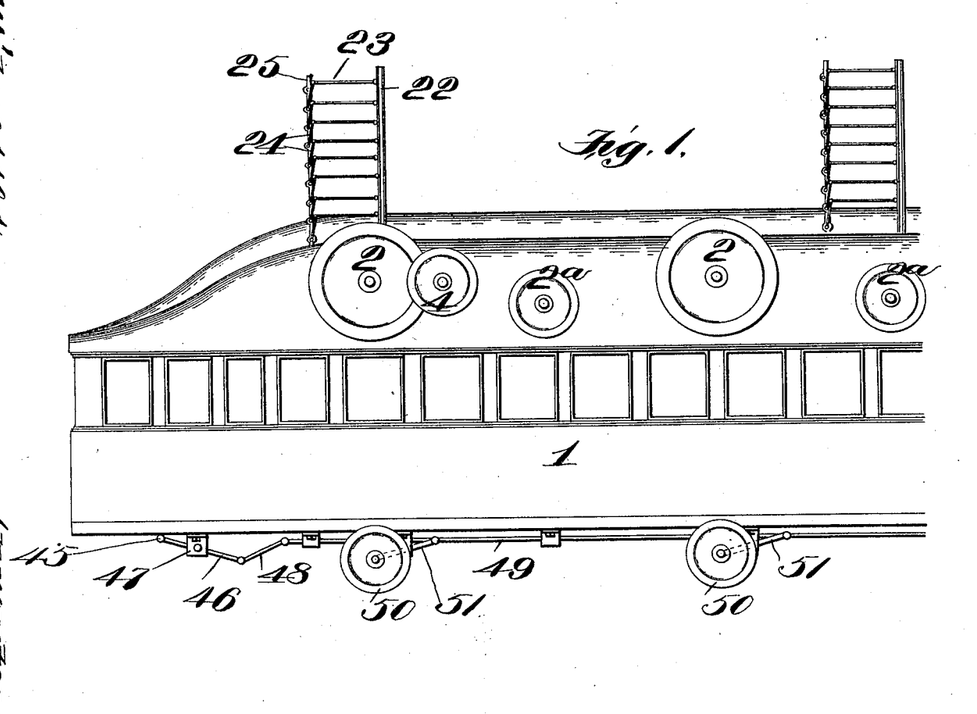
Figure 1 is a side elevation of one end of our improved form of car.
Figure 2:
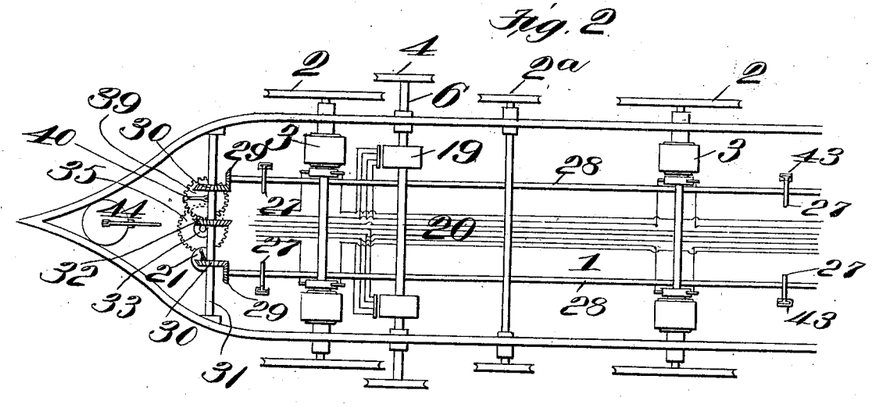
Fig. 2 is a top plan-view, with the top of the car removed to more clearly show the interior mechanism.

Mounted upon the sleeve 6 (see Fig. 2), is a distribution disk 19, from which run service wires 20 to the several motors, the current in said wires, however, being controlled by a regulator 21, in the forward end of the car.

Figure 8:
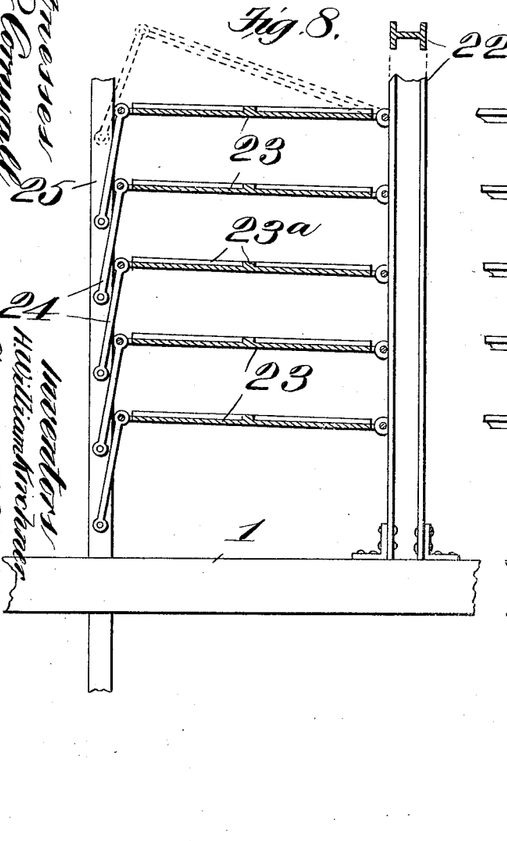
Fig. 8 is a vertical section through one "bank" of aeroplanes.
Figure 9:
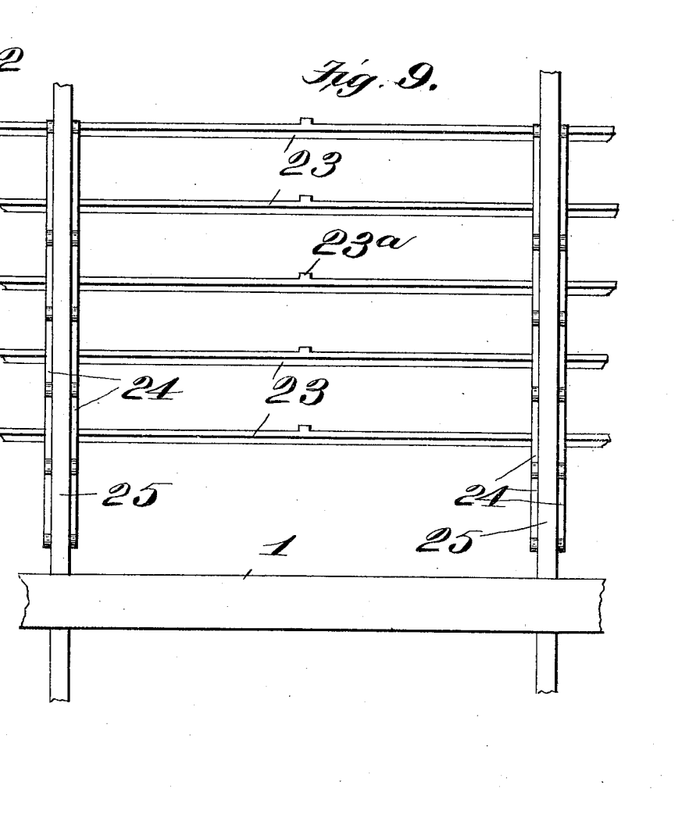
Fig. 9 is a front elevation of the same.
Figure 10:
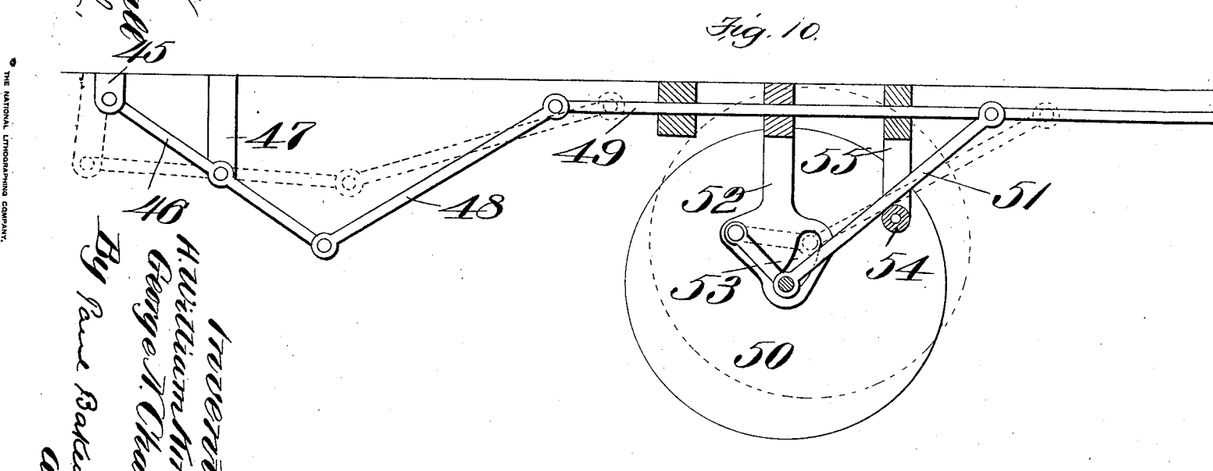
Fig. 10 is a diagrammatical view of the means for applying the resistance, or friction, brake wheels to the lower rails.

Mounted in eyes, or otherwise hinged to a standard 22 secured to the top of the car, are aeroplanes 23, which are preferably braced by ribs 23ª on their upper surfaces, so as to offer no obstruction to the deflection of air from their underneath sides. These aeroplanes are inclined, as shown in dotted lines at the top of Fig. 8, by the upward movement of twin links 24, which are secured to, and actuated by, the operating rods 25, which rods are preferably connected together at their upper ends by a cross-piece 26, as shown in Fig. 4, to add rigidity to the same.

To operate the rods 25 simultaneously, we provide each piece with a rack on its lower end, which rack is operated by a gear-wheel 27, mounted upon a longitudinal shaft 28 running the length of the car. (See Fig. 2.) These shafts 28 are provided with beveled pinions 29 on their ends, which mesh with similar wheels 30 mounted on a cross-shaft 31. The shaft 31 is operated by skew-gears 32 and 33, mounted, respectively, on the shaft 31 and vertical shaft 34, which shaft 34 is provided, at its lower end, with a wheel 35, which receives motion from a pinion 36 operated by a short shaft 37 mounted in a stand 38, which stand is provided with a notched disk 39, with the notches of which engages a gravitating dog 40, mounted in the end of the handle 41, secured to, and adapted to operate, the shaft 37. The function of the gravitating dog 40 and its engagement with the notched disk 39 is to prevent further movement of the train of parts just enumerated, after the aeroplanes have become once "set."

To retain and guide the operating rods 25 in their vertical movement, we provide the lower ends of the same with feathers 42 (see Figs. 5 and 6) which run in ways formed in a bracket 43 secured to the top of the car.

Figures 4, 5, 6:
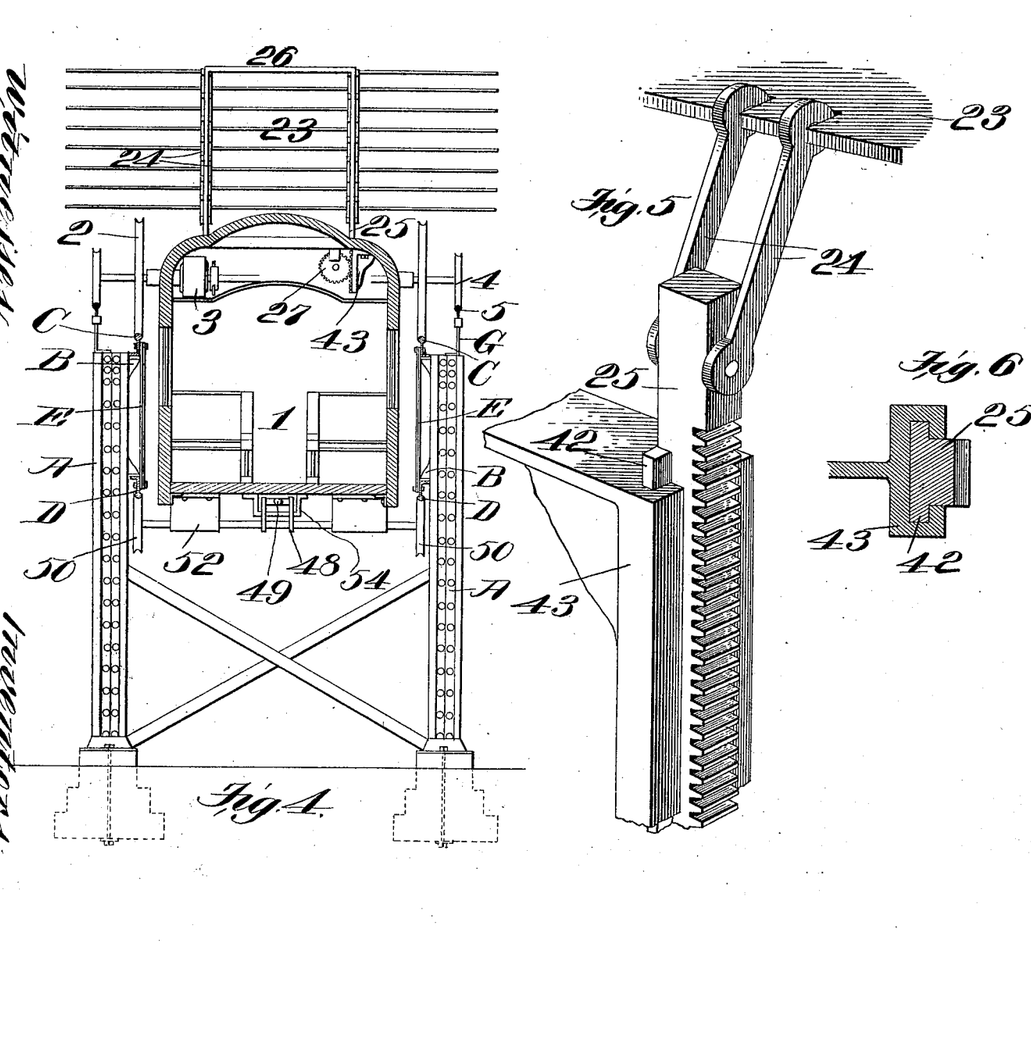
Fig. 4 is a cross-section of the car, showing the same in position on an approved form of elevated way.
Fig. 5 is a detached perspective view of the operating rod for the aeroplanes, the twin-link connection therebetween, and the guide for the rod.
Fig. 6 is a cross-section through the operating rod and its guide.
Figures 14, 15, 16, 17:
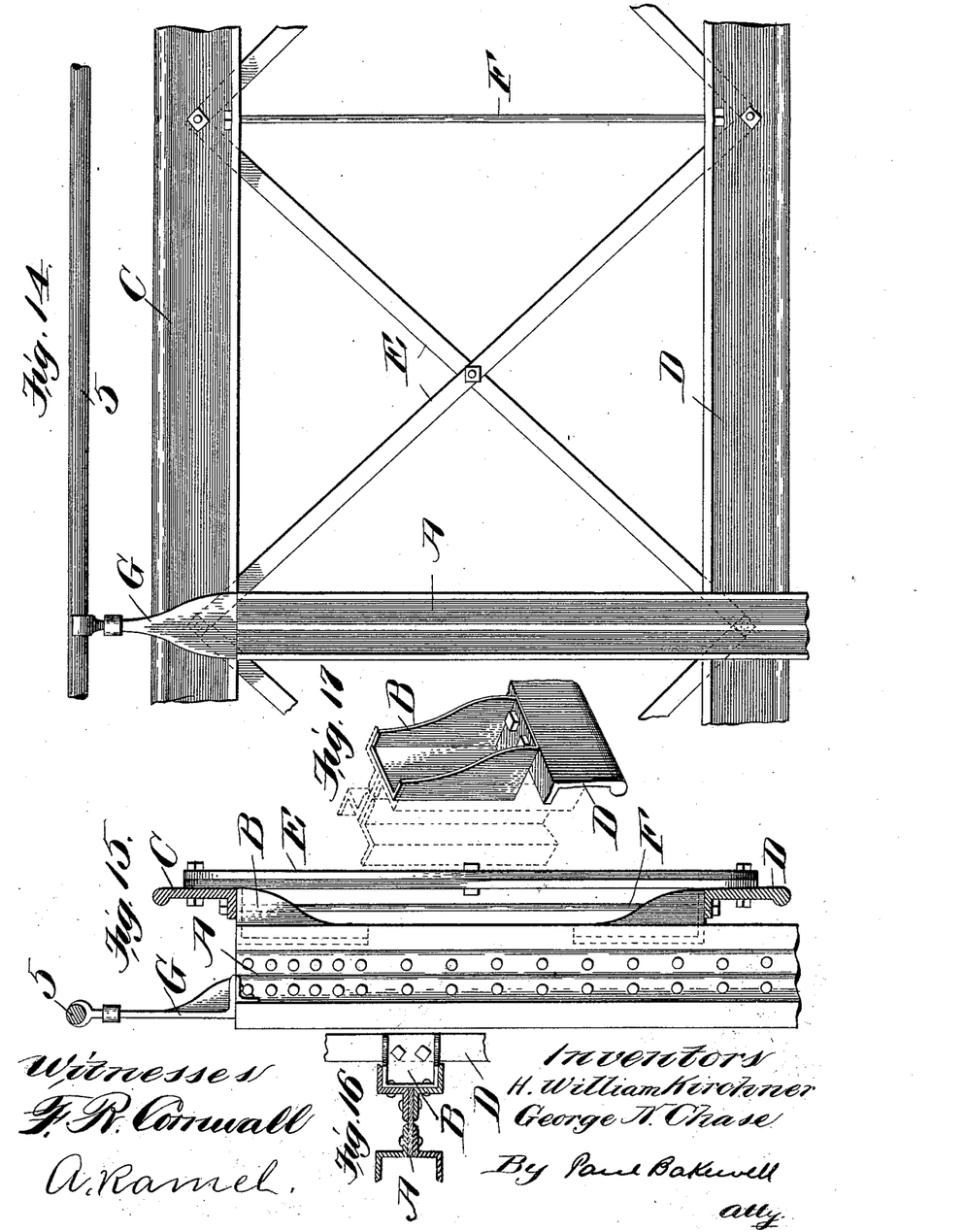
Fig. 14 is a side elevation of a detached portion of our improved form of elevated way.
Fig. 15 is a cross-section through one side thereof, looking toward one of the supporting posts.
Fig. 16 is a horizontal section through the post, taken just above the lower rail, showing the rail-supporting stirrup in position.
Fig. 17 is a perspective view of the stirrup, with a detached portion of the lower rail attached.

The elevated way, as illustrated in the drawings, and which construction we have adopted as being best adapted to this form of car, consists of supporting standards or posts A, of a cross-section, as shown in Fig. 16, placed in pairs at a suitable distance apart and cross-braced, as shown in Fig. 4. In the inner channels of these posts, are introduced supporting stirrups B of a form as shown in Fig. 17. To these stirrups, are secured the upper and lower rails C and D, by bolts or other suitable means. To brace the rails between the posts, we utilize angle braces E, and, at the points of connection of the braces with the rails, we place a tie-rod F, as shown in Figs. 14 and 15.

G indicates a bracket for supporting the trolley-wire 5.

Figure 3:
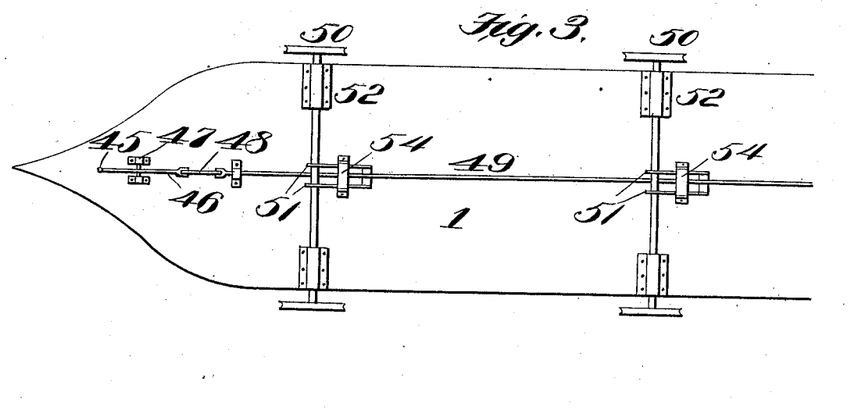
Fig. 3 is a bottom plan.

To throw on resistance to act in the capacity of a brake, we place an air cylinder 44 in the forward end of the car, and force air into the same, at the desired time, by a force-pump. (Not shown.) This cylinder is provided with a piston-head whose rod 45 extends downwardly through the bottom of the car and has connected thereto one end of a lever 46, which lever is pivoted to a hanger 47, and has its opposite end connected to a link or connecting-rod 48, which latter link or rod is connected to, and operates, the brake-rod 49. This brake-rod, as shown in Fig. 3, runs the full length of the car, and has, connected thereto, a little to the rear of the brake-wheels 50, links 51, whose opposite ends are connected to the axle of the brake-wheels. We prefer to provide the hangers 52, which support the wheels 50, with slots 53, which act as guides for the axles, and in that way limit the movement thereof.

To apply the brake-wheels to the lower rail D and thereby generate a friction, air is admitted above the head of the piston in the air cylinder, forcing the same, its rod, and the forward end of the lever 46 downwardly, which forces the rod or link 47 upwardly and rearwardly, as shown in dotted lines, which moves the brake-rod backward. As the brake-rod moves backward, the links 51 are carried with it, and they, forming with the brake-rod 49, a wedge, are forced up by the roller 54 suspended by the bracket 55, and carry with them the wheels 50, which wheels coming in contact with the lower rail D, act as friction-brakes, and thereby stop the car.

We are aware, that, although we have shown and described particular constructions for the utilizing and controlling the adaptation of aeroplanes to a car or other means of transportation, still other constructions might also be as advantageously used, without in the least departing from the nature and principle of our invention.

Having thus described our invention, what we claim, and desire to secure by Letters Patent, is—

1. In combination with a car or other means of transportation, of aeroplanes in the form of blades arranged one above the other, and means for controlling the inclination of said aeroplanes: substantially as and for the purposes described.

2. In combination with a car or other means of transportation, of aeroplanes in the form of blades arranged one above the other mounted above the car, and means for controlling the inclination of said aeroplanes, substantially as and for the purposes described.

3. In combination with a car or other means of transportation, of an elevated way in which said car runs, of aeroplanes on the top of the car, in the form of blades arranged one above the other and friction-brakes on the under side thereof, substantially as and for the purposes described.

4. In combination with a car or other means of transportation, of aeroplanes in the form of blades, arranged one above the other on top of the car, an elevated way provided with four tracks, on which said car runs, and wheels on the under side of the car adapted to be forced up by air pressure and engage the lower rails, whereby they act in the capacity of friction-brakes, substantially as and for the purposes described.

5. In combination with a car or other means of transportation, of standards mounted on the top of the car, aeroplanes hinged to the standards and provided with stiffening ribs on their upper faces, an operating rod for said aeroplanes, and means for actuating the operating-rod, substantially as and for the purposes described.

6. In combination with a car or other means of transportation, of standards mounted on the top of the car, aeroplanes hinged to the standards, a rod connected to, and adapted to operate, the aeroplanes through the medium of links, and means for actuating the rod, substantially as and for the purposes described.

7. In combination with a car or other means of transportation, of standards mounted on the top of the car, aeroplanes hinged to said standards, rods connected at their upper ends by a cross-piece, adapted to operate the aeroplanes, and means for actuating the vertical sections of the operating-rods simultaneously, substantially as and for the purposes described.

8. In combination with a car or other means of transportation, of aeroplanes, rods for operating the aeroplanes, racks on the lower ends of the operating rods, actuating wheels meshing with the racks, and guides for the rods, substantially as and for the purposes described.

9. In combination with a car or other means of transportation, of aeroplanes, arranged in "banks" along the top of the car, and means for operating said "banks" simultaneously, substantially as and for the purposes described.

10. In combination with a car or other means of transportation, of an air cylinder provided with a piston head and rod, the latter extending through the bottom of the car, a lever connected to said piston-rod, a link connected to the opposite end of the lever and to the brake-rod, links arranged on the brake-rod along its length, and having their opposite ends connected to the axles of friction-wheels, and a fulcrum over which said latter links are drawn, whereby the friction-wheels are elevated, substantially as and for the purposes described.

11. In combination with a car or other means of transportation of a brake rod and means for moving the same longitudinally, friction-wheels and their axles, links secured to the axles of the friction-wheels and to the brake-rod, and a fulcrum over which said links are drawn, whereby the friction wheels are moved toward or from the body of the car, substantially as and for the purposes described.

In testimony whereof we hereunto affix our signatures, in presence of two witnesses, this 19th day of November, 1892.

HENRY WILLIAM KIRCHNER.
GEORGE N. CHASE.

Witnesses:
D. I. EZEKIEL,
HUGH K. WAGNER.